(12) United States Patent
Tuulari et al.

(10) Patent No.: US 11,400,995 B2
(45) Date of Patent: Aug. 2, 2022

(54) BICYCLE COMPUTER

(71) Applicant: Polar Electro Oy, Kempele (FI)

(72) Inventors: Esa Tuulari, Kempele (FI); Jukka Happonen, Oulunsalo (FI); Pertti Puolakanaho, Kiviniemi (FI)

(73) Assignee: Polar Electro Oy, Kempele (FI)

( * ) Notice: Subject to any disclaimer, the term of this patent is extended or adjusted under 35 U.S.C. 154(b) by 601 days.

(21) Appl. No.: 16/445,028

(22) Filed: Jun. 18, 2019

(65) Prior Publication Data

US 2020/0001132 A1 Jan. 2, 2020

(30) Foreign Application Priority Data

Jun. 27, 2018 (EP) .................................. 18180088

(51) Int. Cl.
*B62J 45/20* (2020.01)
*A63B 24/00* (2006.01)
*A63B 71/06* (2006.01)
*G01B 7/14* (2006.01)
*G01B 11/14* (2006.01)
(Continued)

(52) U.S. Cl.
CPC .......... *B62J 45/20* (2020.02); *A63B 24/0062* (2013.01); *A63B 71/0622* (2013.01); *A63B 71/0686* (2013.01); *B62J 45/41* (2020.02); *B62J 50/22* (2020.02); *G01B 7/14* (2013.01); *G01B 11/14* (2013.01); *G01B 17/00* (2013.01); *G01P 13/00* (2013.01); *A63B 2071/0658* (2013.01);
(Continued)

(58) Field of Classification Search
CPC ............ A63B 24/0062; A63B 71/0622; A63B 71/0686; A63B 71/06863; B62J 45/20; B62J 45/41; B62J 50/22; G01P 13/00; G01B 7/14; G01B 11/14; G01B 17/00
See application file for complete search history.

(56) References Cited

U.S. PATENT DOCUMENTS 10,472,015 B1 * 11/2019 Sonderegger ........ G01R 31/371
2013/0171599 A1 * 7/2013 Bleich ..................... G16H 20/30
434/247
(Continued)

FOREIGN PATENT DOCUMENTS

CN 105852841 A 8/2016
EP 0638336 A1 2/1995
(Continued)

OTHER PUBLICATIONS

Extended European Search Report issued by the European Patent Office in relation to corresponding EP Application No. EP 18180088.9 dated Jan. 17, 2019, 7 pgs.

*Primary Examiner* — Francis C Gray
(74) *Attorney, Agent, or Firm* — FisherBroyles, LLP

(57) ABSTRACT

A bicycle computer for monitoring performance of a user of a bicycle includes a processing circuitry; a user interface; an attaching unit for arranging the bicycle computer in an attached position; and at least one integrated proximity sensor arranged and dimensioned to measure, in the attached position, proximity data being indicative of a distance to a body part. The processing circuitry is configured to obtain the proximity data from the at least one integrated proximity sensor and to process the proximity data into one or more cycling metric. The user interface is configured to output the one or more cycling metric.

19 Claims, 13 Drawing Sheets

(51) Int. Cl.
    *G01B 17/00*     (2006.01)
    *G01P 13/00*     (2006.01)
    *B62J 50/22*     (2020.01)
    *B62J 45/41*     (2020.01)

(52) U.S. Cl.
    CPC . *A63B 2071/0694* (2013.01); *A63B 2220/803* (2013.01); *A63B 2220/805* (2013.01)

(56) References Cited

U.S. PATENT DOCUMENTS

| | | | |
|---|---|---|---|
| 2013/0210583 A1* | 8/2013 | Kametani | B62M 3/00 482/8 |
| 2016/0084869 A1* | 3/2016 | Yuen | A63B 21/072 73/510 |
| 2017/0168555 A1* | 6/2017 | Munoz | A61B 5/681 |
| 2017/0337033 A1* | 11/2017 | Duyan | G06F 3/165 |
| 2019/0247717 A1* | 8/2019 | Winterbottom | G06Q 50/22 |
| 2019/0290965 A1* | 9/2019 | Oren | A63B 71/0622 |

FOREIGN PATENT DOCUMENTS

| | | |
|---|---|---|
| EP | 3026589 A1 | 6/2016 |
| KR | 20120007779 A | 1/2012 |

\* cited by examiner

BICYCLE COMPUTER

CROSS-REFERENCE TO RELATED APPLICATION

This application claims priority from European Patent Application No. 18180088.9, filed Jun. 27, 2018, which is incorporated by reference herein in its entirety.

BACKGROUND

Field

The invention relates to bicycle computers. More particularly, the present invention relates to measuring cycling metrics utilizing bicycle computers.

Description of the Related Art

Bicycle computers are used to monitor physical performance during cycling (i.e. using/riding/performing exercise with a bicycle) and possibly also during other activities. Normally, one or more external sensor device in communication with the bicycle computer is used to measure cycling metrics. However, such may be troublesome as the external sensors may need to be attached to a bicycle and paired with the bicycle computer. Therefore, there seems to be room to provide cycling metric sensing solutions which are more straightforward to use.

SUMMARY

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1:
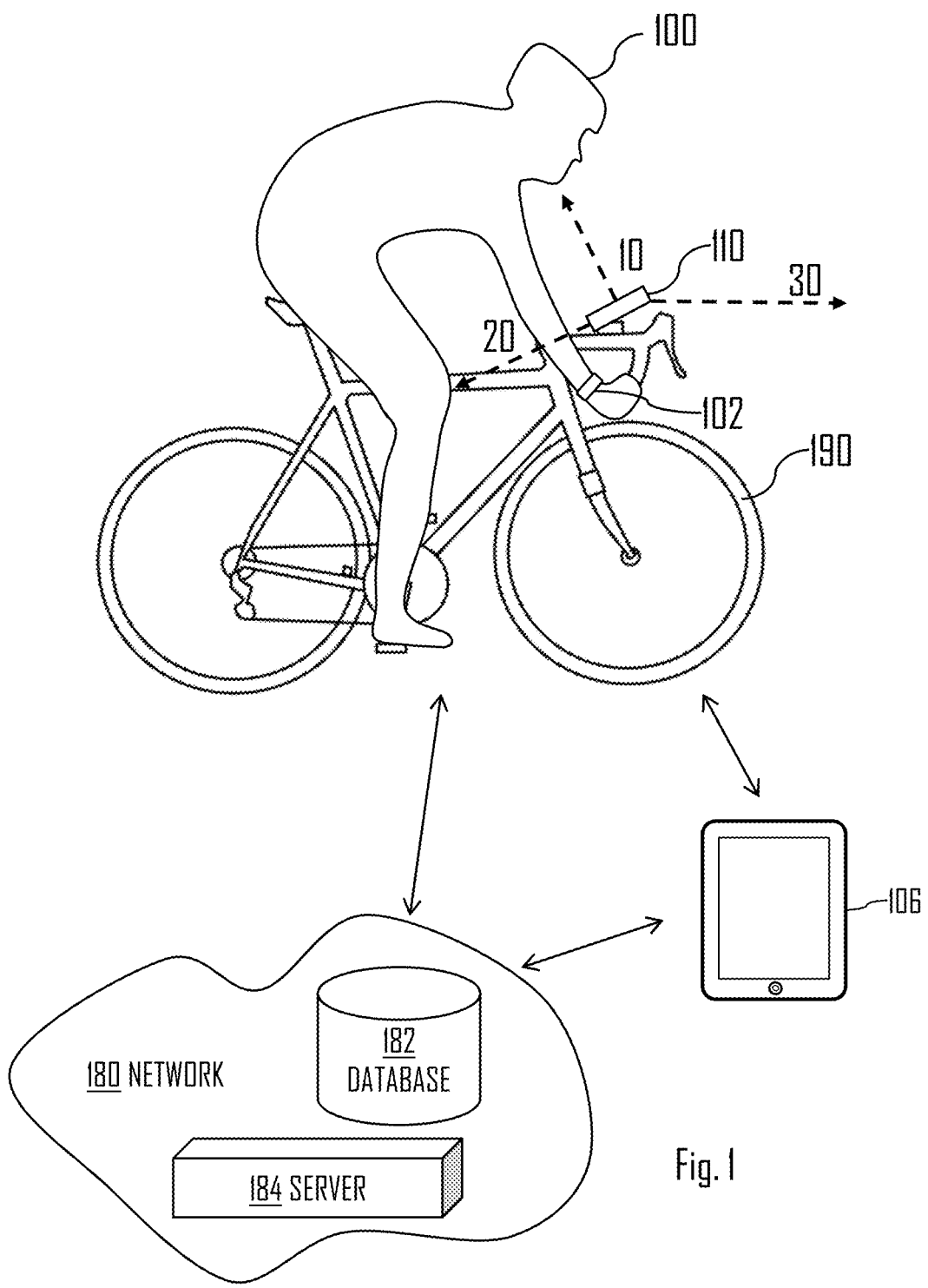
FIG. 1 illustrates an example a system to which embodiments may be applied.

FIG. 1 illustrates a system to which embodiments may be applied. Referring to FIG. 1, the system may be a system for monitoring physical activity, such as physical training, of a user 100. For example, the system may be used to monitor physical activity of the user that is performing cycling exercise and/or exercise involving cycling (e.g. triathlon). Cycling here may mean bicycling or biking using a bike, bicycle or cycle 190. The bicycle 190 may have one or more wheels, preferably two wheels.

The system may comprise a bicycle computer 110 (can be referred to as cycling computer and/or bike computer, for example). The bicycle computer 110 may be configured to be attached to the bicycle 190. For example, the bicycle computer 110 may be attached to/on a stem of the bicycle 190 (as shown later in FIG. 6B) or to/on a handlebar 202 of the bicycle (as shown later in FIG. 6A). The bicycle computer 110 may alternatively be attached to some other part of the bicycle 190, such as frame of the bicycle 190 (e.g. top tube, down tube), or head tube of the bicycle 190. However, attachment to the handlebar area may provide a good position for measuring cycling related metric(s) and enabling the user 100 to interact with the bicycle computer 110 (e.g. display and/or user input). It is further noted that the user 100 may select the attachment position of the bicycle computer 110 according to her/his preference.

Furthermore, besides a bicycle of FIG. 1, the bicycle computer 110 may be installed to any human-powered vehicle, such as a unicycle, a tricycle, a quadricycle, a recumbent, a stationary exercise-bike, rowing machine, ergometer, boat, and/or canoe, to name a few examples. In such cases the bicycle computer 110 may still referred to as a bicycle computer or possibly as a portable physical activity monitoring apparatus.

In an embodiment, the bicycle computer 110 is configured to be attached to a wrist or body of the user 100. Hence, attachment to the bicycle 190 is not necessary in all embodiments.

It is possible that the system comprises additional units, such as a wrist device 102, one or more external sensor devices, portable electronic device (PED) 106, and/or network 180 comprising database 182 for storing data and a server 184 for processing data.

For example, the network 180 may provide user accounts for each user of the system, wherein the user account enables the user to store cycling metrics a user account of the user. For example, the metrics may be stored from the bicycle computer 110 to the network 180 and viewed via PED 106. So, as indicated with arrows, the different entities of the system may be communicatively coupled with each other to enable the user to store, process, and output data related to the cycling metrics using the different devices. PED 106 may be, for example, a mobile phone, smart phone, tablet computer or a laptop.

The wrist device 102 and/or the external sensor devices may comprise one or more sensors, such as a cardiac activity sensor (electrode based measurement, optical measurement and/or biosignal measurement), motion circuitry (e.g. accelerometer, gyroscope and/or satellite positioning circuitry). These sensors may provide measurement data to the bicycle computer 110 and/or to the network 180, for example. For example, the bicycle computer 110 may output cardiac activity metric(s) related to parameters, such as Heart Rate Variability (HRV), Heart Beat Interval (HBI), and/or heart rate. On the other hand, the bicycle computer 110 may receive motion measurements and use said measurements as will be later discussed in more detail (e.g. see FIG. 7).

It is noted that bicycle computers, such as the computer 110, are used to display different cycling metrics, such as cadence, power, speed, left-right balance, cardiac activity, and the like. The bicycle computer 110 may thus comprise necessary means for providing such output and/or receive the necessary data from some external sensor(s) to enable the user 100 to adjust her/his training accordingly. Output may or may not comprise transmission of the cycling metrics to an external device or external system. External device or system may be further used to process the cycling metrics and possibly output the further processed cycling metrics in response to request(s). Normally, for example, cadence is measured using a cadence sensor which may be a set of two devices that mount to the bicycle. A magnet may be attached to pedal(s). Each time the magnet passes a magnetic sensor (e.g. attached to bicycle frame), the sensor registers the rotation. The result is a sensor that works much like as a speedometer. However, such requires much additional work from the user 100 as the cadence sensor needs to be installed to the bicycle 190 and it is bicycle specific. Furthermore, the external sensors may require a power source (e.g. battery) which needs to be regularly changed causing additional work for the user. As noted, other external sensor devices may be used and these may include a speedometer and/or power sensor, for example.

Therefore, there is provided a solution which enables cadence measurement using an integrated sensor at the bicycle computer 110. Integrated herein may mean a sensor that is a part of the bicycle computer 110, possibly at least partially or fully enclosed by a body of the bicycle computer 110. Particularly, use of a proximity sensor(s) for measuring cadence is presented herein. Using such proximity sensor(s) may provide additional benefits which are discussed below in more detail. In general, the presented solution utilizes one or more integrated proximity sensors for measuring and outputting one or more cycling metrics. Still referring to FIG. 1, beams 10, 20, and 30 are shown which may illustrate examples of proximity measurement beams. For example, beam 20 may be used to measure cadence, beam 30 may be used measured distance to bicycle and/or person in front (e.g. drafting measurement) and beam 10 may be used to measure distance to upper body of the user (e.g. riding position measurement).

Figure 2A:
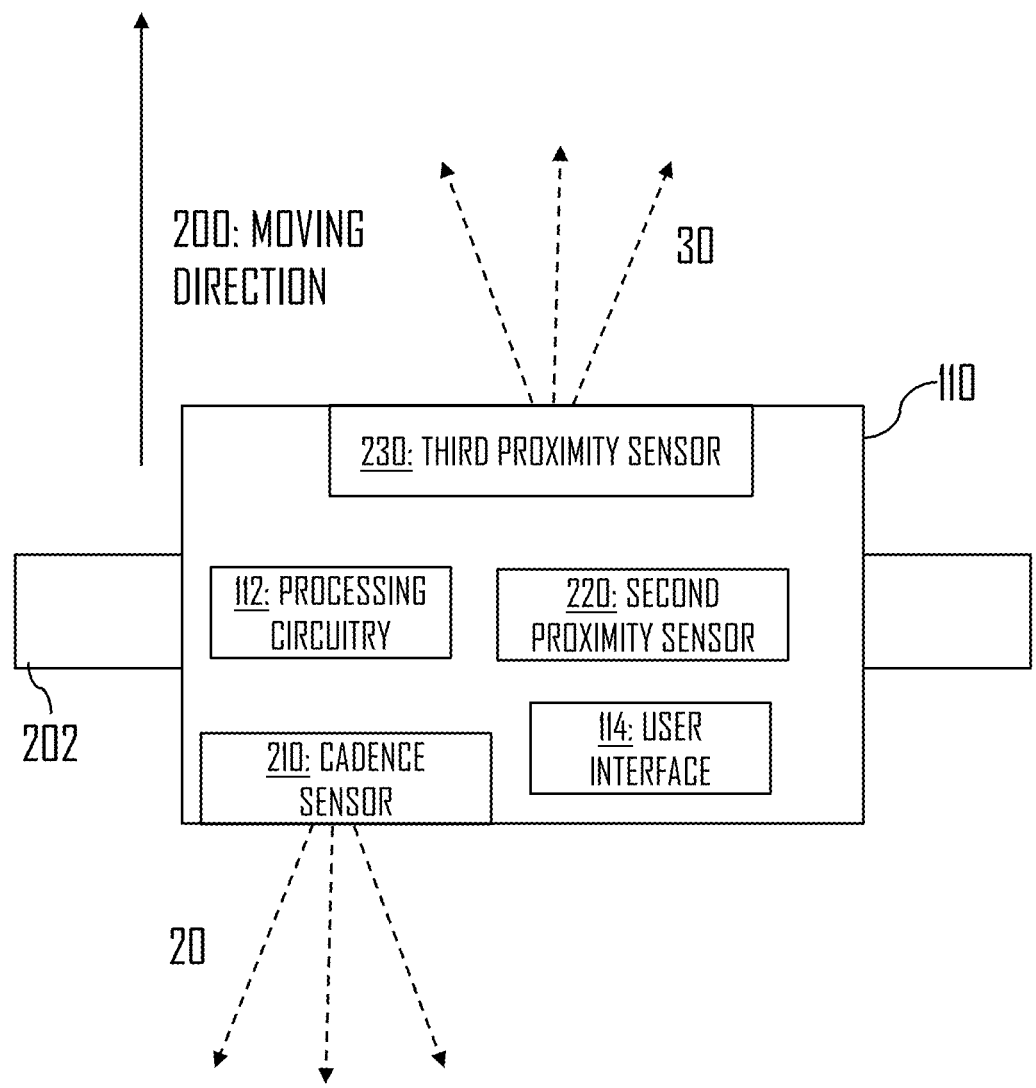
FIGS. 2A, 2B, and 2C illustrate some embodiments of a bicycle computer.
Figure 2B:
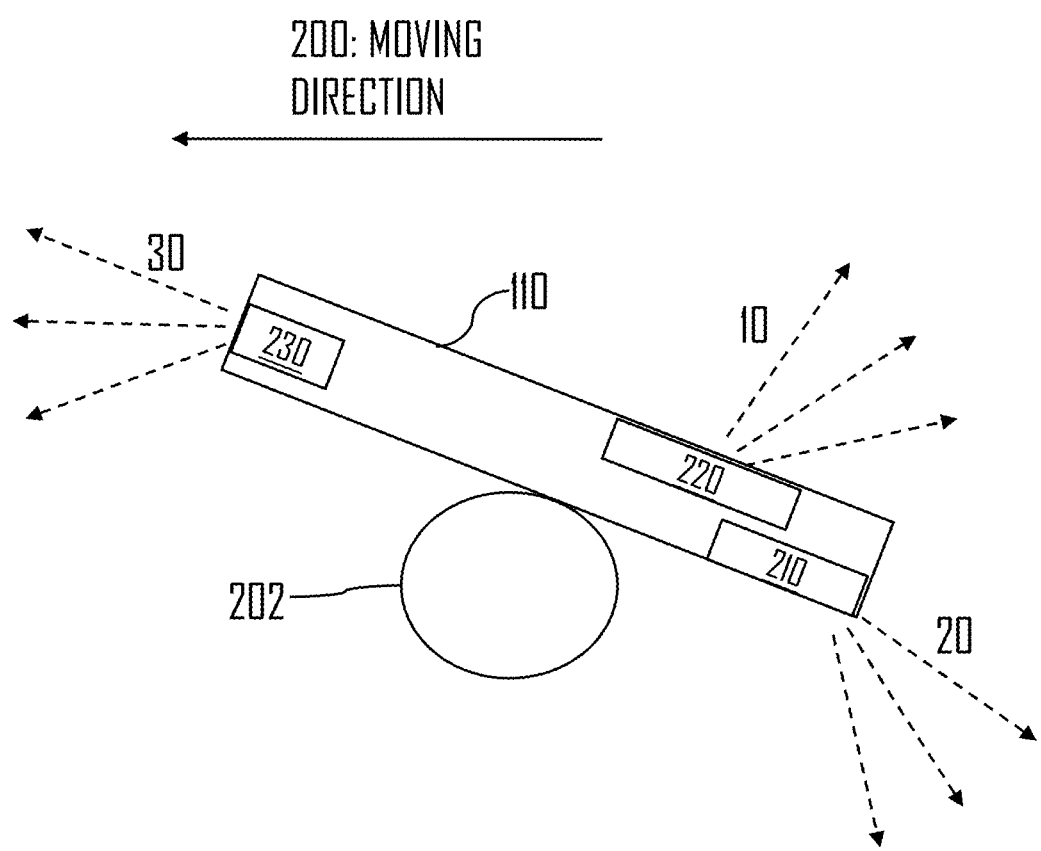
Figure 2C:
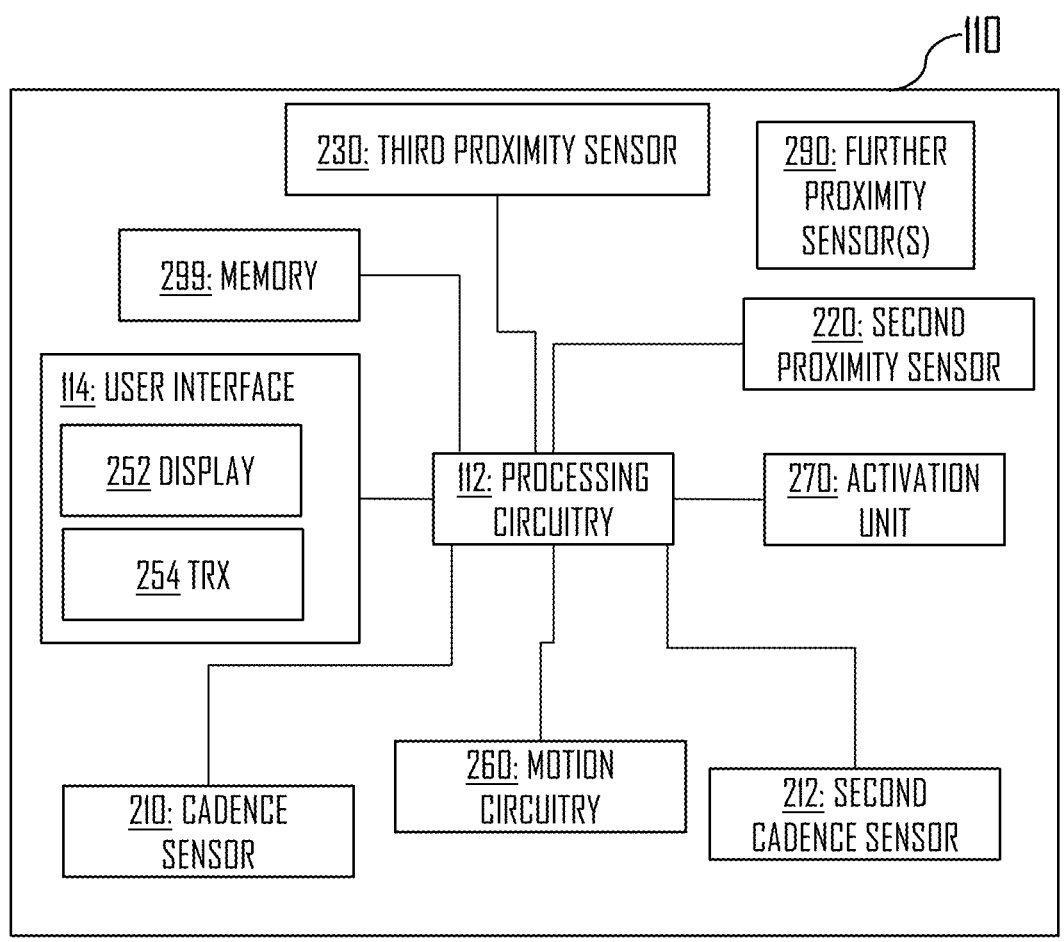

FIGS. 2A, 2B and 2C illustrate block diagrams according to some embodiments. Referring to FIG. 2A illustrating a top view of the bicycle computer 110, the bicycle computer 110 comprises a processing circuitry 112, a user interface 114, an attaching unit (not shown in FIG. 2A) for arranging the bicycle computer 110 in (or into) an attached position (e.g. in which the bicycle computer is attached to the bicycle 190 or some external entity that is attached or coupled with the bicycle 190), and at least one integrated proximity sensor 210, 220, 230 arranged and dimensioned to measure, in the attached position, proximity data being indicative of a distance to a body part, wherein the processing circuitry 112 is configured to obtain the proximity data from the at least one integrated proximity sensor 210, 220, 230 and to process the proximity data into one or more cycling metric, and wherein the user interface 114 is configured to output the one or more cycling metric.

Referring now to FIG. 2C, the user interface 114 may comprise a display 252 for displaying the one or more cycling metrics to the user 100 (i.e. the cyclist). The display 252 may be a liquid crystal display, for example. The display 252 may show information in various means. The information may be displayed using letters or numerals, for example. Further, a LED (Light Emitting Diode) may be used to illustrate certain type of information to the cyclist. The information may be expressed by the color of the LED or the blinking frequency of the LED. The user interface 114 may additionally or alternatively comprise a speaker used to output audio sounds for outputting the one or more cycling metrics. It is further noted that the user interface 114 may be configured to enable user interaction with the device including user input/user control of the bicycle computer 110. For example, the display 252 may be a touch-screen display.

In an embodiment, the user interface 114 comprises a communication circuitry (TRX) 254. The TRX 254 may be configured to provide communication capabilities to the bicycle computer 110. Thus, data may be transmitted from and in to the bicycle computer 110. For example, sensor data, software update(s), and/or control signal (e.g. user inputted control signals) may be received from one or more external device(s), such as from the PED 106 or from the network 180. For example, the cycling metrics and/or measurement(s) (e.g. raw measurement data) may be transmitted to an external device (e.g. PED 106 or network 180). The TRX 254 may utilize one or more technologies, such as Universal Serial Bus (USB), Local Area Network (LAN), Wireless LAN (WLAN, can be referred to as WiFi), Bluetooth, Bluetooth Low Energy (BLE), ANT, ANT+, Near Field Communication (NFC), 5 kHz band transmission, and/or any other wired/wireless communication method enabling unidirectional and/or bidirectional data transfer.

The processing circuitry 112 may be implemented with a processor (e.g. digital signal processor) provided with suitable software embedded on a computer readable medium (e.g. see memory 299 of FIG. 2C which may be used to store the software or computer program code), or with separate logic circuit, such as an application specific integrated circuit (ASIC).

Although not shown in FIG. 2C, the bicycle computer 110 may comprise a power source, such as rechargeable battery for providing operating power to different entities and/or functions of the bicycle computer 110.

Now, referring again to FIG. 2A, the attaching unit is not shown in said Figure. However, such attaching unit may be any kind of attaching unit that enables the bicycle computer 110 to be detachably attached to the bicycle 190, such as to the handlebar 202 or handlebar area. For example, the system may comprise a bike mount configured to be attached to the bicycle 190, and configured to receive the bicycle computer 110. For example, the attaching unit may be used to attach the bicycle computer 110 to the bike mount. In another example, the attaching unit comprises the bike mount. In an embodiment, the one or more proximity sensors (e.g. 210, 220, 230 described herein are comprised in the bike mount and communicatively coupled (wirelessly or via wire) with the bicycle computer 110 (e.g. when the bicycle computer 110 is attached to the bike mount.

In an embodiment, the one or more proximity sensors (e.g. 210, 220, 230) described herein are comprised in one or more external apparatuses. Hence, the system may also operate utilizing external proximity sensors that are communicatively coupled (e.g. via wire or wirelessly) with the bicycle computer 110.

So, when the bicycle computer 110 is attached to the bicycle 190, the bicycle computer 110 may move to the moving/cycling direction 200, i.e. forward. Hence, the beam 20, if a cadence sensor 210 is used, may be targeted towards the user's 100 lower body. Hence, the beam 30, if a sensor 230 is used, may be targeted towards the moving direction 200. Beam 10 is not shown in FIG. 2A, but may be targeted towards the user's 100 upper body if a sensor 220 is used. Hence, the attached position may be predetermined, i.e. determined by to the attaching unit attachment to the bicycle 190 and also by the way the bicycle computer 110 may be detachably attached to the attaching unit. For example, the bicycle computer 110 may comprise a first part of the attaching unit that may be coupled with a second part of the attaching unit, wherein the second part is configured to be attached to the bicycle 190. The predetermined attached position may mean that the bicycle computer 110 is always attached to a bicycle more or less (i.e. substantially) the same way. Thus, the beam(s) 10, 20, 30 may be directed the same way. However, it may be possible, for example, to direct or adjust the beam(s) 10, 20, 30 depending on how the bicycle computer 110 is attached to the bicycle 190. Hence, the predetermined attached position is not always necessary, but may be beneficial.

For example, in an embodiment, the bicycle computer 110 (e.g. the processing circuitry 112) is configured to obtain position data (e.g. from motion circuitry 260) and to determine attached position based on the position data. Position data may comprise, for example, data indicative of a tilt of the bicycle computer 110. Based on said determined attached position, the bicycle computer 110 may adjust one or more of said beams 10, 20, 30. That is, the adjusting may enable the measurement beams to be directed to needed direction. In an embodiment, the bicycle computer 110 adjusts the beam(s) 10, 20, 30 based on measurement by the corresponding proximity sensor. So, for example, if cadence measurement does not work (e.g. signal too weak or not obtained at all), the beam 20 may be adjusted (e.g. directed to certain other location or beam intensity increased (e.g. power of the measurement increased)).

Referring to FIG. 2B, a side view of the bicycle computer 110 is shown. As shown, the bicycle computer 110 may be attached to the handlebar 202 which is not always necessary as explained above. Now, beam 10 is shown as targeted upwards, essentially towards the upper body (e.g. head, and/or chest) of the user 100. It is not necessary, but possible to place the sensor 220 on/at the top surface of the bicycle computer 110. This may enable the beam 10 to be targeted upwards when the bicycle computer 110 is used in the shown attached position (i.e. which may be predetermined or predefined position). Similarly, the cadence sensor 210 may be placed on/at read-bottom surface of the bicycle computer 110. Similarly, the sensor 230 may be placed on/at front part of the bicycle computer 110. However, it will be obvious to the skilled person that these different placement options are optional as long as the sensor is placed such that it may measure the needed metric in the attached position. It is further noted that the attached positon may be different for different users if the attaching unit enables tilting of the bicycle computer 110. However, in some embodiments, the attached position may be fixed such that the bicycle computer 110 needs to be attached to the bicycle 190 in a predetermined way. However, if the position/tilt of the bicycle computer 110 is adjustable, the user 100 may try different positions/tils to find the most suitable for measuring the needed metric. It may be even possible to utilize the same sensor to measure different metric at different time (e.g. by changing the position/tilt of the bicycle computer).

It is noted at this point that it is not necessary to use all the listed proximity sensors 210, 220, 230 although all of them can be used together. For example, the bicycle computer 110 may comprise only the cadence sensor 210, or only the sensor 220, or only the sensor 230, or any combination of said sensors.

Figure 3A:
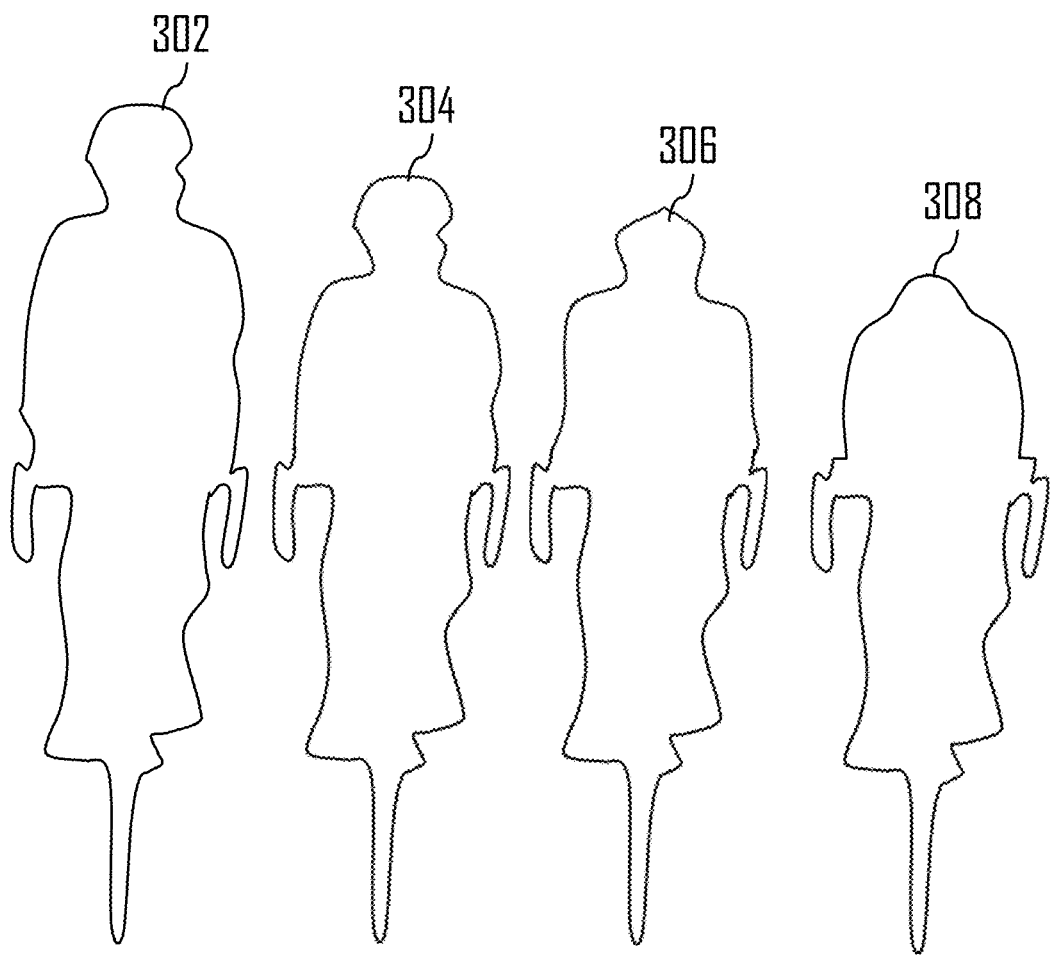
FIGS. 3A, 3B, and 3C illustrate some embodiments related to measuring riding position metric.
Figure 3B:
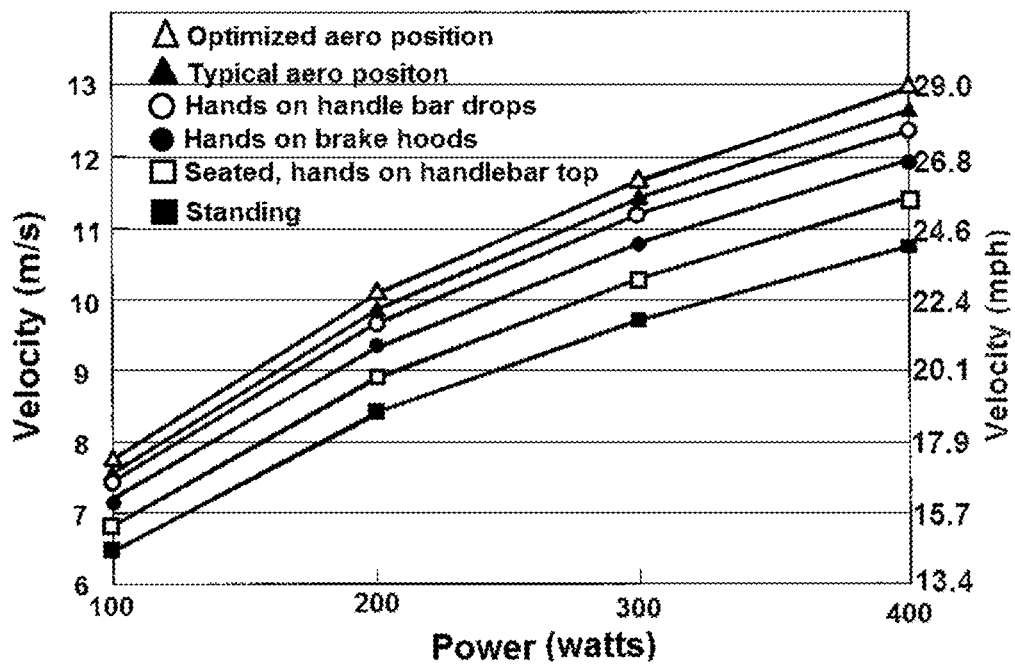
Figure 3C:
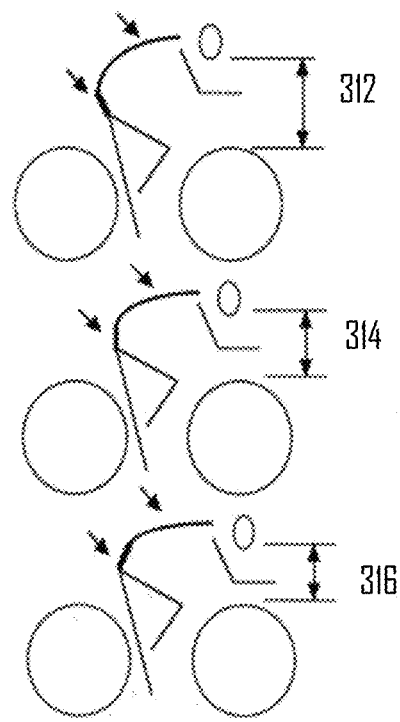

Let us then look at embodiments of FIGS. 3A, 3B and 3C which relate to the measurement of riding position. As noted, in an embodiment, the at least one integrated proximity sensor comprises a proximity sensor 220 (referred to as second proximity sensor in the Figures) arranged and dimensioned to measure, in the attached position, proximity data being indicative of a distance to upper body part of the user 100 of the bicycle 190. Further, the processing circuitry 112 may be configured to process the proximity data into a riding position metric. Said proximity data may be referred to as first proximity data in some examples.

In an embodiment, the upper body part comprises stomach of the user, chest of the user and/or head of the user. These may be especially suitable for measuring the riding position. Sometimes the riding position can be referred to as posture or riding posture.

Let us look at FIG. 3A which illustrates silhouettes 302, 304, 306, 308 of the user 100 using the bicycle 190. The silhouettes may illustrate the cyclist-bicycle combination from front or back. Silhouette 302 may illustrate the cyclist in a high position, and silhouettes 304, 306, 308 gradually lower riding positions. I.e. silhouette 308 may represent situation in which the cyclist is in the lowest possible and/or lowest used riding position. From FIG. 3A we can see correlation and/or connection between riding position and cross-sectional area. That is, the lower the riding position, the lower the cross-sectional area. Hence, by lowering her/his riding position, the user may reduce air drag or air resistance. It is noted that air resistance is affected by at least two things: the cross-sectional area and speed.

FIG. 3B illustrates an example cycling velocity (meters per second or miles per hour) as a function of power (Watts). From FIG. 3B it can be deduced, that velocity increases for same amount of power as the riding position gets lower (e.g. optimal aero position versus standing position). FIG. 3B may illustrate an example scenario and thus real-life applications and indications may vary while the correlation between produced power and obtained speed may remain similar and dependent on riding position.

FIG. 3C further shows how distance 312, 314, 316 changes as the user gets lower (distance 312>distance 314>distance 316). I.e. distance 312 may be associated with average or OK riding position (e.g. hips tilted back approximately 15 degrees), distance 314 may be associated with better riding position (e.g. hips neutral or "vertical"), and distance 316 may be associated with best or optimal riding position (e.g. hips tilted forward approximately 15 degrees). The distances 312, 314, 316 may refer to distance from the proximity sensor 220 (or sensors if more than one sensor is used) to head and/or chest of the user 100.

So, the sensor 220 may provide the distance measurement signal to the processing circuitry 112 which may process the signal and output the riding position metric. The riding position metric may further be processed, by the processing circuitry 112, into an air-resistance metric if speed data is also available (e.g. from satellite position circuitry or other speed measurement sensor). The air resistance metric may be outputted via the user interface 114, for example. The riding position metric may comprise, for example, indication about the distance (e.g. millimeter, centimeter, meter), visual indication, and/or text indication about the riding position. That is, it may be indicated that the riding position is good, average, bad, or optimal to name a few examples. On the other hand, the one color may indicate good position, another bad positon and another optimal position. For good, bad and optimal position the bicycle computer 110 may utilize one or more predetermined thresholds for said distance between the upper body part and the sensor 220. For example, the riding position metric may indicate whether or not the distance exceeds a certain threshold, thus indicating whether the riding position is good or bad, for example. Bad riding position (can be referred to as ineffective or less effective riding position) may refer to, for example, standing and hands-on-handlebar-top riding positions; good riding position (can be referred to as effective or more effective riding position) may refer to hands-on-brake-hoods and handlebar-drops riding positions; and optimal may refer to typical aero position and optimized aero position (see FIG. 3B). However, these may be seen as examples and the implementation may vary.

In an embodiment, the sensor 220 is referred to as riding position sensor 220 measuring riding position of the user. As noted above, the distance from upper body to said sensor may be associated and/or correlated with riding position of the user (and hence at least affects the air resistance).

FIGS. 4A, 4B, 4C, 4D, 4E, 4F, and 4G illustrate embodiments related to cadence measurement using the proximity sensor(s). In an embodiment, the at least one integrated proximity sensor comprises a cadence sensor 210 arranged and dimensioned to measure, in the attached position, cadence data being indicative of a distance to at least one leg of a user of the bicycle 190, wherein the processing circuitry 112 is configured to process the cadence data into a cadence metric, which may be outputted by the user interface 114.

Figure 4A:
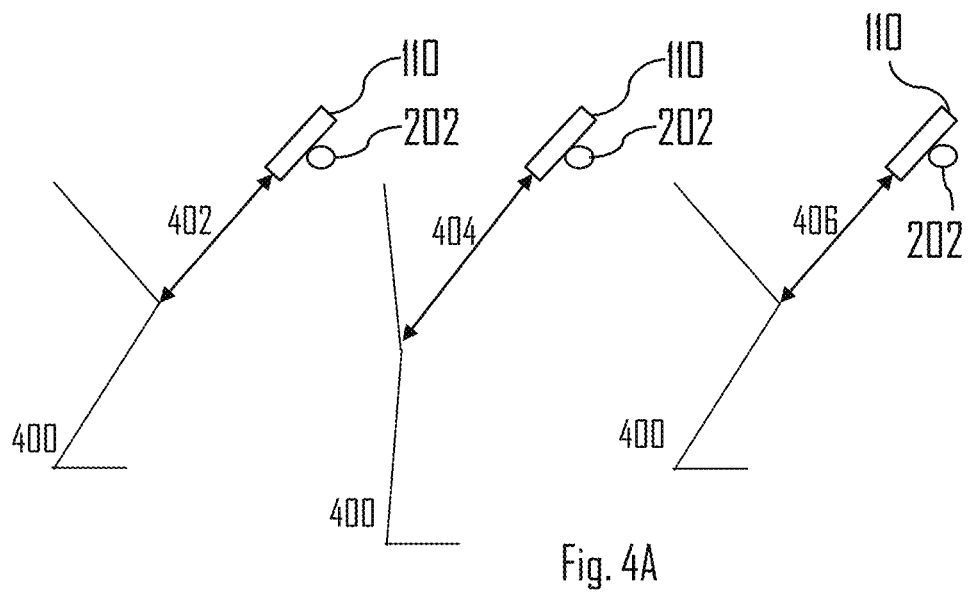
FIGS. 4A, 4B, 4C, 4D, 4E, 4F and 4G illustrate some embodiments related to measuring cadence metric.
Figure 4B:
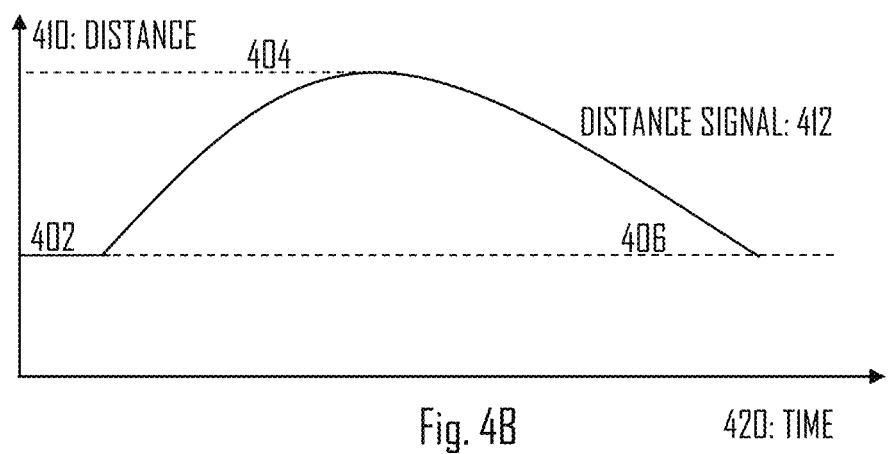

So, in addition or alternatively to the riding position metric measurement, the bicycle computer 110 may measure cadence of the user using at least the cadence sensor 210. Referring to FIGS. 4A and 4B, a one motion cycle of user's leg is illustrated in three phases. One motion cycle may equal to pedal turning full circle, wherein cadence may equal to motion cycles per minute. Optimal cadence may be about 90 rounds per minute, and for example, the bicycle computer 110 may output, via user interface 114, instructions/indications for the user to achieve said optimal cadence. So, distance 402 between the cadence sensor 210 (not shown in FIG. 4A) and user's leg 400 may indicate distance when the pedal is in up position. The distance may change and may equal to distance 404 once the user's leg is extended, i.e. the pedal is in down position. Once user's leg is again in up position and the pedal has gone full circle, the distance may equal to distance 406 which may be substantially the same as distance 402. It is noted that there may be some small variations between each motion cycle and between cycles as user's leg position (e.g. position on the pedal) may change within cycle and/or between cycles. FIG. 4B illustrates distance 410 (i.e. distance between the sensor 210 and the user's leg) as a function of time 420 during one motion cycle. As noted distance 404 may be greater than distances 402, 406. Hence, cadence may be computed from the measurements as this difference may be observed in each motion cycle, for example.

Figure 4C:
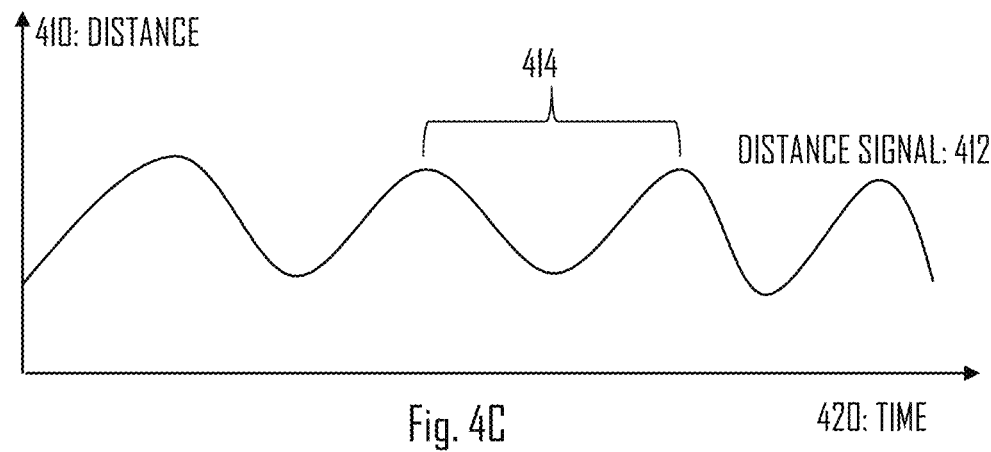

FIG. 4C illustrates an example embodiment showing distance 410 as function of time 420. In FIG. 4C, distance is indicated for approximately duration of four motion cycles. One motion cycle may be indicated as motion cycle 414. So, the distance signal 412, obtained from sensor 210, may be used, by the processing circuitry 112, to calculate how many motion cycles there are in one minute, for example. Hence, cadence may be computed, and cadence metric outputted. The cadence metric may comprise, for example, measured cadence, target cadence and/or difference to target cadence.

Figure 4D:
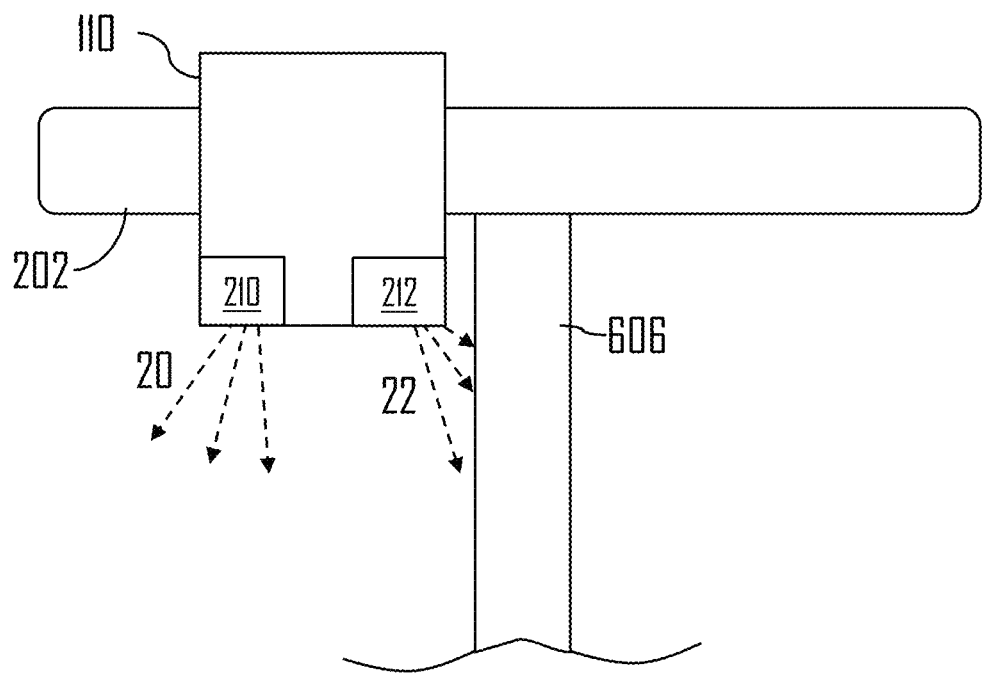
Figure 4E:
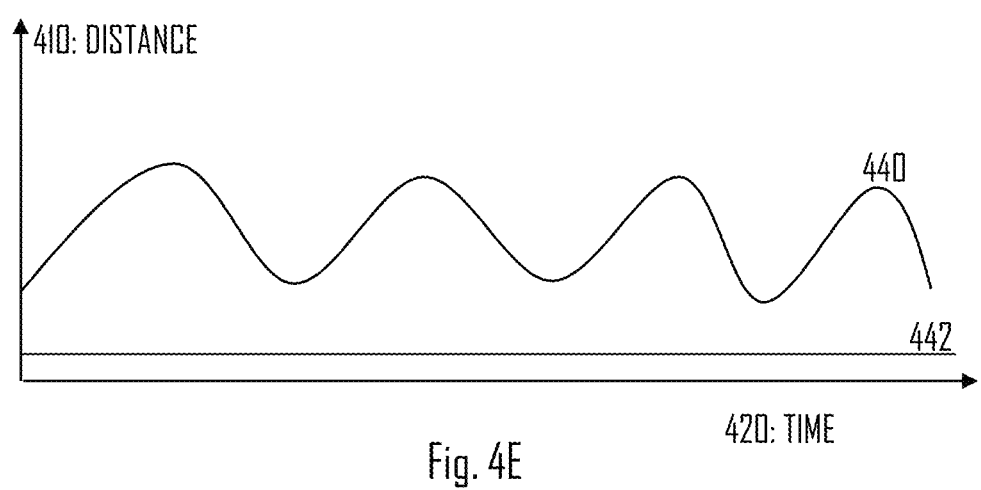
Figure 4F:
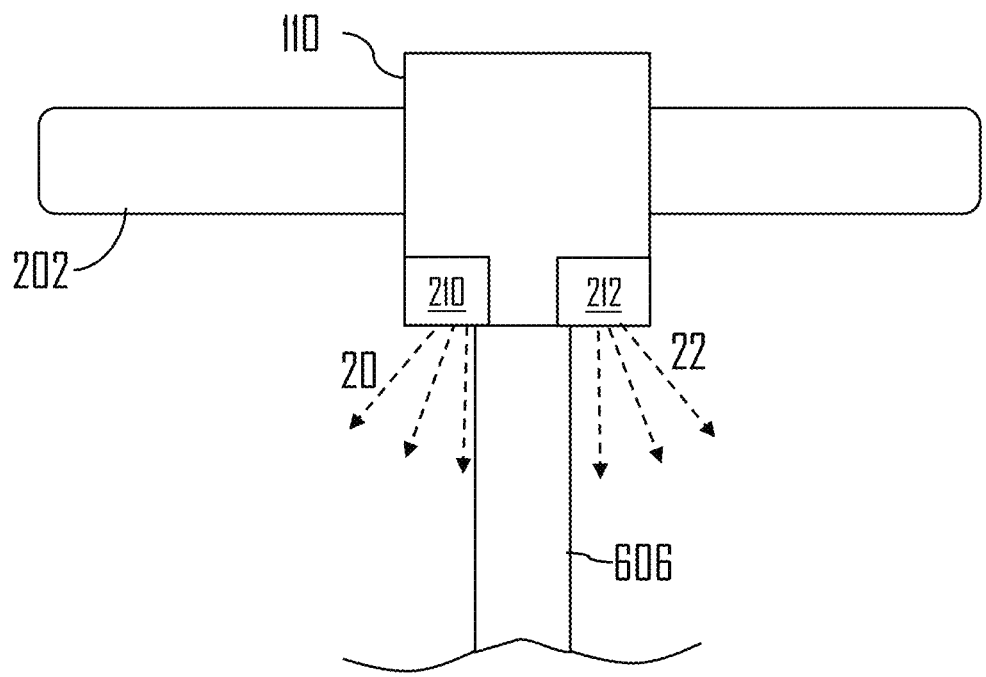

In an embodiment, referring to FIGS. 2C, 4D, and 4F, the bicycle computer 110 comprises a first cadence sensor 210 and a second cadence sensor 212. Both sensors may be integrated proximity sensors, each configured to measure cadence of the cyclist independently. So, the at least one integrated proximity sensor comprises the first and second cadence sensors 210, 212 arranged and dimensioned to measure, in the attached position, first and second cadence data respectively, the first cadence data being indicative of a distance to a first leg of the user and the second cadence data being indicative of a distance to a second leg of the user, wherein the processing circuitry 212 is configured to obtain the first and second cadence data, and to perform a sensor fusion algorithm to obtain the cadence metric. That is, there may be situations in which the cadence measurement using one sensor is not sufficient. One example is shown in FIG. 4D in which the bicycle computer 110 is attached on the left side of the handlebar 202. Thus, stem 606 or some other part of the bicycle 190 may block one of the sensors 210, 212 from measuring the proximity of the user's leg. In the particular example, the stem 606 blocks the sensor 212 from measuring proximity to the user's other leg, i.e. right leg (beam 22 is blocked by stem 606). However, the sensor 210 may still validly measure distance to the left leg, and thus cadence metric may be obtained. Example of the signals is shown in FIG. 4E in which signal 440 may be the signal obtained from sensor 210 and signal 442 obtained from the sensor 212 (i.e. indicates constant distance such as distance to the stem 606).

Figure 4G:
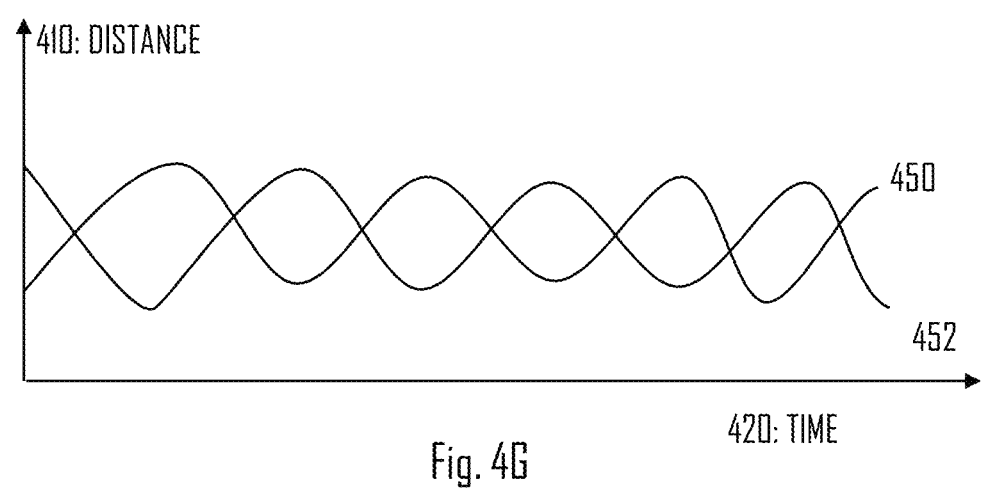

FIGS. 4F and 4G illustrate a scenario in which the bicycle computer 110 is attached to the handlebar 202 (e.g. substantially at middle portion of the handlebar 202) such that both sensors 210, 212 may measure distance to the user's legs. I.e. beam 20 is configured towards one leg and beam 22 towards other leg. Thus, signals 450, 452 (i.e. one indicating distance to first leg and one to second leg) may be obtained based on which the processing circuitry 112 may compute the cadence metric. It is noted that the distance signals are simply for illustrative purposes and the actual distance may vary. Such sensor fusion may provide benefits in addition to the one of the sensors being blocked. Another benefit is that cadence of one legged user may be computed. A further benefit is that the cadence measurement may be even more accurate as it is not limited to signal from one source. So, interruption periods (e.g. user blocks one of the sensors with her/his arm by reaching for a drinking bottle (e.g. water bottle)) and the like may have less effect on determining the cadence metric.

Figure 7:
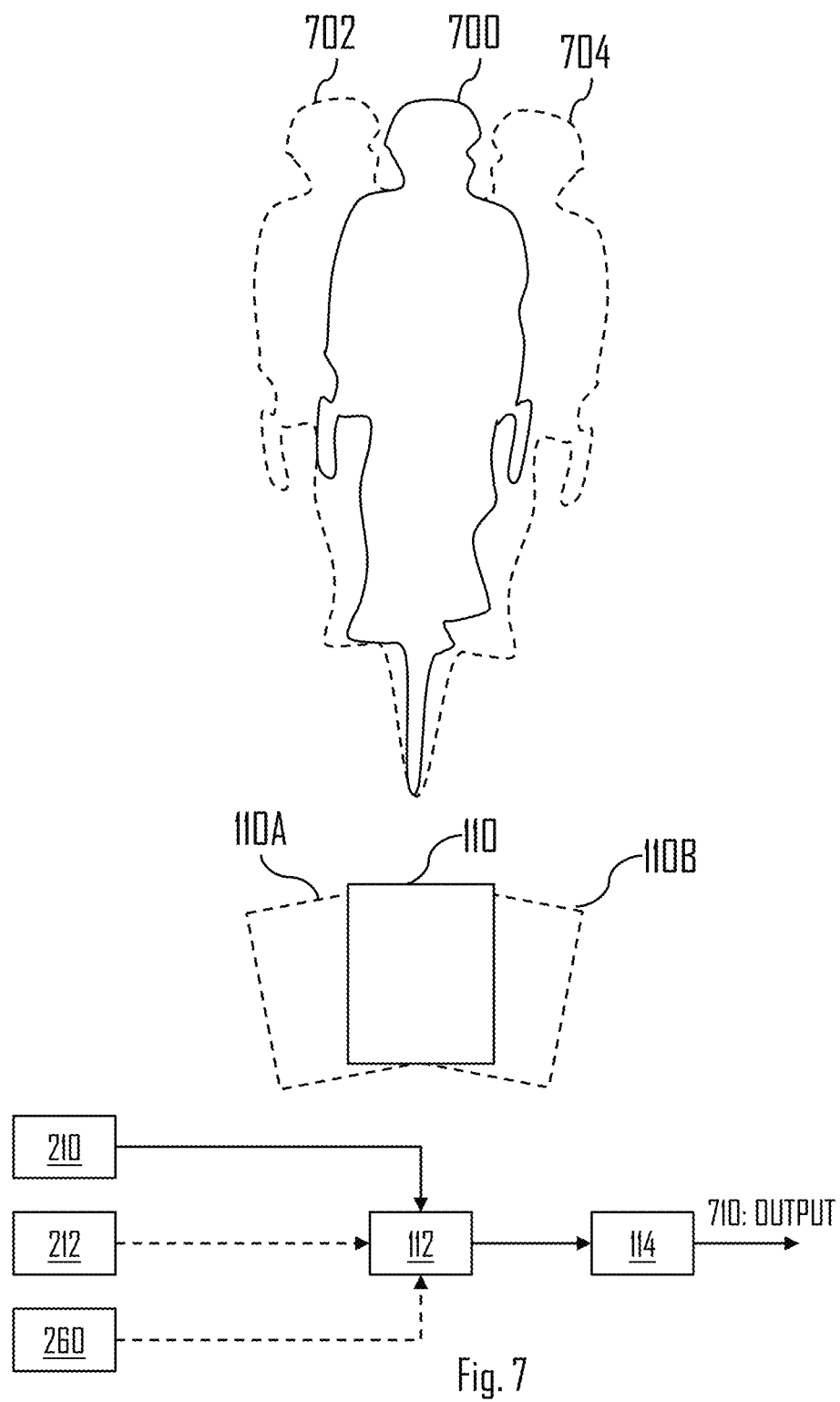
FIGS. 7, 8, and 9 illustrate some embodiments.

Let us then look closer at embodiment shown in FIG. 7. Referring to FIG. 7 and also to FIG. 2C, the bicycle computer 110 may further comprise a motion circuitry 260 configured to measure motion data. If the bicycle computer 110 does not comprise such motion circuitry 260 (or even if it does comprise), external sensors may be used to acquire said motion data (e.g. wrist device 102) via the user interface 114, and more precisely via the TRX 254. I.e. the motion circuitry 260 may be comprised in the bicycle computer 110 and/or in some other device, for example, worn by the user (i.e. wearable device). It is explicitly noted that the motion circuitry 260 is not necessary in all embodiments.

The motion circuitry 260 may comprise accelerometer(s), gyroscope(s), magnetometer(s), satellite positioning circuitry or circuitries, altimeter, and/or barometer, to name a few examples. The satellite positioning circuitry may comprise one or more of Global Positioning System (GPS), Global Navigation Satellite System (Glonass) or Galileo circuitry. The motion circuitry 260 may measure local motion of the bicycle computer 110, and thus the local motion of the bicycle 190 in the attached position. The local motion may be used to determine, for example, left-right motion of the bicycle 190 and/or the user which may be used as a further indication about cadence of the user 100. Hence, in an embodiment, the motion circuitry is configured to measure motion data, and the processing circuitry 112 is further configured to obtain the motion data (i.e. from the circuitry 260) and the cadence data (e.g. from one or more proximity based cadence sensors 210, 212), and to perform a sensor fusion algorithm to obtain the cadence metric. The cadence metric may further be outputted 710 by the user interface 114, wherein the outputting may comprise data transmission (e.g. wireless transmission of the metric to another device), displaying, and/or audio indication of the metric. In FIG. 7, the left-right movement of the user-bicycle pair 700 is shown as dotted figures/shapes 702, 704. Similarly, left-right movement of the bicycle computer 110 is indicated as dotted FIGS. 110A, 110B. These variations may be measured using the motion circuitry 260, and further be used to compute the cadence metric together with the proximity-based measurement. That is, the additional measurement by the motion circuitry 260 may make the cadence measurement even more robust to measurement errors and/or enhance reliability of the cadence metric determination. AS noted with the dotted arrows, measurements by sensor 212 and/or 260 are not always necessary, but may be beneficial.

Figure 5A:
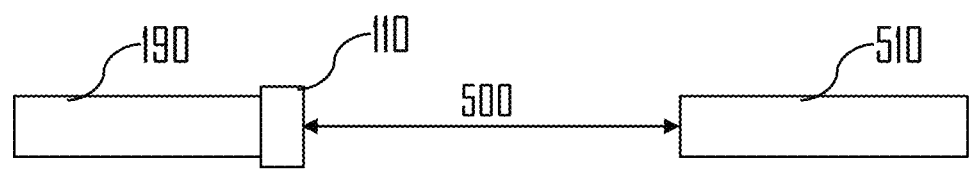
FIG. 5A illustrates an embodiment related to measuring drafting metric.

FIG. 5A illustrates an embodiment which relates to measuring a drafting metric. Referring to FIGS. 5A and 2C, the at least one integrated proximity sensor comprises a proximity sensor 230 arranged and dimensioned to measure, in the attached position, a proximity data being indicative of a distance to another bicycle and/or another user (e.g. body part of said another user) riding another bicycle, wherein the processing circuitry 112 is configured to process the proximity data into a drafting metric. Said proximity data may be referred to as second proximity data, for example. So, in the attached position, the proximity sensor 230 may be targeted towards the road ahead, i.e. towards moving direction.

As shown in FIG. 5A, distance between bicycle 190 and another bicycle 510 may be indicated with an arrow 500. Drafting can be defined as a technique where two vehicles or other moving objects are caused to align in a close group reducing the overall effect of drag due to exploiting the lead object's slipstream. Especially when high speeds are involved, as in cycling, drafting can significantly reduce the paceline's average energy expenditure required to maintain a certain speed and can also slightly reduce the energy expenditure of the lead vehicle or object. So, for example, due to drafting the same amount of power may provide a higher speed (see e.g. FIG. 3B). Both drafting and riding position may have an effect on how much speed is acquired using a certain power. It is noted that in real-life scenarios other aspects, such as elevation and friction, may affect the power-speed-correlation.

Anyhow, the sensor 230 may measure distance to another bicycle 510 and/or cyclist riding the bicycle 510 (or it can be some other object, such as a car). From this distance, the drafting metric may be computed. For example, the drafting metric may comprise simply distance indication (i.e. distance 500 to another bicycle 510). It may again be possible to utilize certain distance threshold(s) to compute whether the user 100 is benefiting from drafting. For example, if distance 500 exceeds a threshold (e.g. is equal or less than a certain distance threshold), the processing circuitry 112 may output a drafting metric that indicates that benefit (e.g. substantial benefit) is acquired from drafting. Substantial benefit may be, for example, at least or more than 1, 5 or 10 percent gain in power-to-speed ratio compared to situation without drafting. However, these may be examples and thus implementations may vary. If the distance is more than said threshold, the drafting metric may indicate that no benefit (e.g. substantial benefit) is gained from drafting. So, in an example embodiment, the drafting metric indicates whether the user 100 is drafting or not. This may be based on comparing distance 500 measured by the sensor 230 to a predetermined threshold. In an embodiment, said predetermined threshold is dynamic and changes according to current speed of the bicycle 190. So, for example, if the current speed of the bicycle 190 (e.g. measured by the bicycle computer 110) increases, the threshold may increase. That is, the higher the speed, the longer the distance 500 may be to still obtain benefit from drafting. Furthermore, drafting benefit may correlate with speed. I.e. the higher the speed is, the greater the benefit from drafting. In another embodiment, the drafting metric may indicate how well the user 100 is able to take advantage of the drafting. SO, the metric may also be qualitative in addition or alternatively to being quantitative.

Figure 5B:
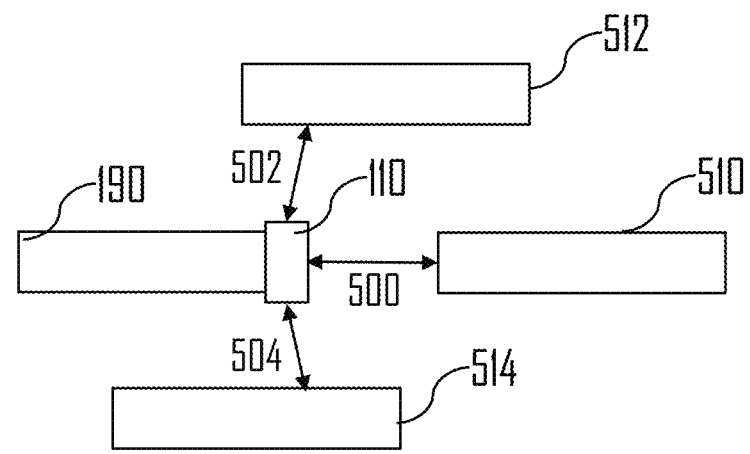
FIG. 5B illustrates an embodiment related to measuring boxed-in metric.

FIG. 5B illustrates an embodiment. Referring to FIGS. 5B and 2C, the at least one integrated proximity sensor comprises sensors 230, 290 arranged and dimensioned, in the attached position, to be directed to front (e.g. sensor 230 which can be used also for drafting metric determination but which is not necessary for this embodiment) and sides of the bicycle 190, the processing circuitry 112 further configured to process the measurements from the sensors into a boxed-in metric (can be referred to as trapped metric indicating a level of entrapment of the bicycle and/or the user in a cycling group or level of ability of movement). So, said further sensors 290 may comprise at least two proximity sensor: one directed to one side (e.g. left) and the other directed to another side (e.g. right). Said sensors 290 may measure distances 502, 504, wherein distance 502 is to a bicycle/cyclist 512 and distance 504 is to a bicycle/cyclist 514. As can be seen in FIG. 5B, the bicycle 190 (and consequently the user 100) is boxed-in as there are bicycles on both sides and also one bicycle 510 in front. So, there is no way to proceed without braking and loosing speed. Therefore, from said measurements, the processing circuitry 112 may compute the boxed-in metric which may indicate whether or not the user 100 and/or bicycle 190 is boxed-in or not. It is noted that elements 510, 512, 514 may refer to bicycle/cyclist pairs and/or to some other physical objects, such as cars, wall, fence, that may block the way for the bicycle 190.

In an embodiment, the system further comprises a proximity sensor directed towards back (i.e. backwards) of the bicycle 190. Hence, it may be measured whether there is another bicycle or object behind the bicycle 190. For example, said proximity sensor may be a separate sensor that wirelessly or using a wire transmits measurements to the bicycle computer 110. Thus, the processing circuitry 112 may utilize the additional measurement to determine the boxed-in metric. Said additional sensor should be attached such that it may measure the environment behind the user 100 (e.g. attachment to saddle or seat post).

It is further noted that the boxed-in metric determination may be based on one or more distance thresholds set by the system and/or by the user 100. So, for example, distances

502, 504, 500 may need to equal or be less than certain threshold in order to determine that the user 100 is boxed-in. If they are greater than certain threshold(s), the user 100 may not be determined to be boxed-in. Side thresholds may be different than front thresholds, for example.

Figure 6A:
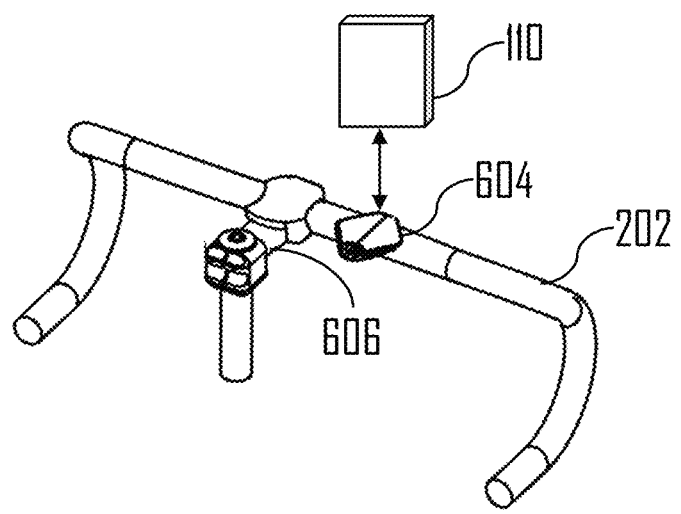
FIGS. 6A and 6B illustrate some embodiments related to attachment of the bicycle computer to a bicycle.
Figure 6B:
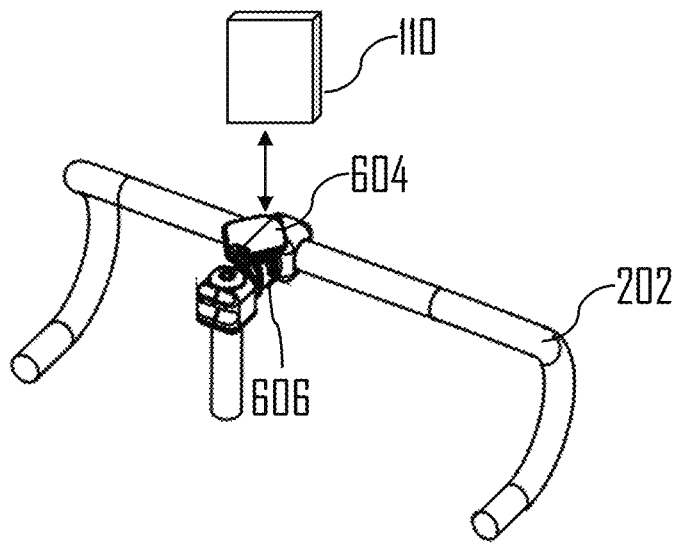

FIGS. 6A and 6B illustrate some example embodiments of attachment of the bicycle computer 110 to the bicycle 190. Referring to FIGS. 6A and 6B, the bicycle computer 110 may comprise an attaching unit 604 (can be referred to as attachment unit, bike mount, or fixing unit) that enables detachable attachment of the bicycle computer 110 to the bicycle 190. For example, the attaching unit 604 may be attached to handlebar 202 as in FIG. 6A or to the stem 606 as in FIG. 6B. Further, the bicycle computer 110 may be attached to the attaching unit 604, and thus to the handlebar 202 or to the stem 606. The handlebar 202 may comprise the stem 606 in some embodiments. However, as noted above, these attachment options should be seen as examples and not necessarily limiting as the bicycle computer 110 may be attached to some other part of the bicycle 190, for example. But as noted, according to an example embodiment, in the attached position, the bicycle computer 110 is attached to handlebar 202 of the bicycle 190. The handlebar 202 may be of any form. That is, it does not need to be of the form shown in FIGS. 6A and 6B (although such may be beneficial) but straight handlebars 202 are suitable as well, for example. For example, the attaching unit 604 may comprise components, such as flexible strap(s), that enable the bicycle computer 110 to be attached to the handlebar 202.

Referring again to FIG. 2C, according to an embodiment, the bicycle computer 110 further comprises an activation unit 270 configured to activate the at least one integrated proximity sensor (e.g. 210, 212, 220, 230, 290) responsive to detecting motion exceeding an activation threshold. For example, the activation threshold may equal to detecting that the bicycle 190 starts to move. Additionally, the movement may need to last, in some embodiments, at least a certain time before the activation is performed.

According to an example embodiment, the activation unit 270 is further configured to deactivate the at least one integrated proximity sensor (e.g. 210, 212, 220, 230, 290) responsive to detecting motion exceeding a deactivation threshold. For example, the deactivation threshold may equal to full stop of the bicycle 190. Additionally, the stopping may need to last, in some embodiments, at least a certain time before the deactivation is performed.

Figure 8:
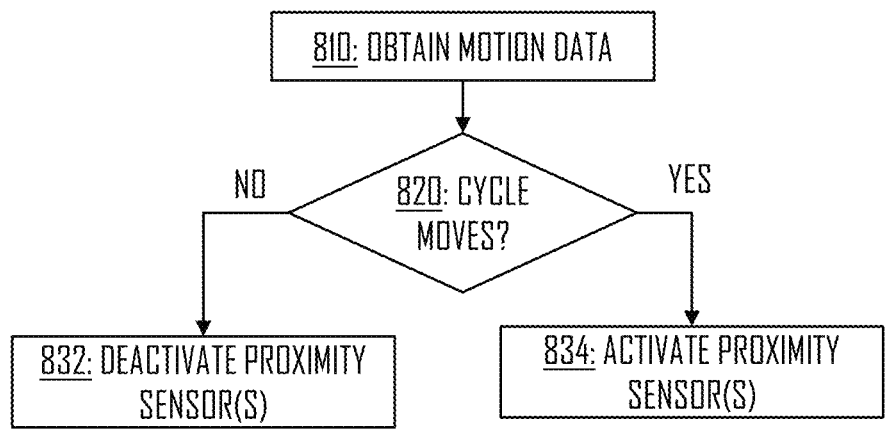

The activation unit 270 may obtain motion data, for example, from the motion circuitry 260 based on which the (de)activation may be performed. As noted above, the motion data may comprise data from speed sensor(s), acceleration sensor(s), gyroscope(s), and/or from satellite position circuitry. So, the proximity sensor(s) may be activated when the bicycle starts to move and deactivated when the bicycle 190 stops, for example. The detection may be based on motion data based on which speed and/or acceleration is calculated. Based on speed and/or acceleration, the activation unit 270 may determine whether or not the bicycle 190 is moving. Hence, the activation or deactivation may be performed. FIG. 8 illustrates an embodiment showing the (de)activation process: in block 810 the activation unit 270 may obtain motion data; in block 820 the activation unit 270 may determine, based on the motion data, whether or not the bicycle moves; if the bicycle moves, the proximity sensor(s) may be activated (block 834), if not, the proximity sensor(s) may be deactivated (block 832). It is note that activation of already active and/or deactivation of already inactive proximity sensor(s) may not be necessary.

Let us then discuss in more detail what kind of proximity sensors (i.e. sensors 210, 212 220, 230, 290) can be used to obtain the benefits of the proposed solution. It is noted that generally any kind of proximity measurement may be used. Some examples of proximity measurement techniques may comprise light based proximity measurement, sound based proximity measurement, and/or radio frequency (RF) based proximity measurement.

Light based sensing or proximity measurement may utilize, for example, visible light, ultraviolet (UV), infrared (IR) and/or laser. For example, Light Detection and Ranging (LiDAR) may be used which may utilize IR (e.g. near IR), visible light, and/or UV radiation. Light based sensing may comprise utilizing one or more matrix sensors, such as a camera. Hence, the proximity measurements may be in some embodiments based on camera measurements, i.e. the proximity sensor may comprise a camera or cameras (e.g. stereo view). For example, in such case the processing circuitry 112 may be configured to perform image processing to determine distance and/or proximity of a measured object.

Sound based sensing or proximity measurement may utilize, for example, ultrasound. For example, the sound based sensing may comprise transmitting sound signal (i.e. beam), by the sensor, towards measured entity (e.g. leg, upper body, rider in front) and measuring bounced-back sound. Knowing how fast the sound signal travels, distance may be computed as known in the art of proximity measurement. For example, distance to user's leg may change and thus the cadence may be determined using the sound measurement.

RF based sensing or proximity measurement may utilize impedance measurement, for example. That is, the proximity sensor may detect impedance changes in its environment which may be used to detect proximity and/or proximity changes. For example, cadence may be detected based on impedance measurement as the user's 100 leg(s) (i.e. when moving) may change measured impedance in a periodical manner, where one period may equal to one motion cycle. For impedance measurement, the sensor may comprise one or more antennas and/or it may utilize one or more antennas of the bicycle computer 110.

For example, cadence may be measured using the sound, light and/or RF based measurements. For example, using light based measurement, light is transmitted/emitted, and reflected light is measured. Intensity of the measured light may change, and from that change, for example, the cadence may be measured. It is noted that cadence measurement may be relative and there may be no need to exactly determine distance to the target. It may suffice that the periodic change is observed from the signal to determine cadence. RF measurement may be similar as light based sensing, i.e. impedance changes may be observed.

Regarding riding position, drafting and/or boxed-in metrics, the measurement may be based on any one or plurality of the described technologies. For example, it may be beneficial to utilize light and/or sound based measurements as distance increases. It may be even possible to utilize different measurement technologies for obtaining different metrics. Thus, for example, interference between measurements may be avoided. Thus, for example, cadence measurement may utilize one of said measurement options (e.g. light, sound or RF) and riding position another of said options.

In an example embodiment, cadence sensor 210 and/or 212 utilizes light based measurement such as IR measurement and sensor 220 utilizes sound based measurement. In another embodiment, said technologies are reversed between the sensors 210 and/or 212 and 220.

It is further noted that one sensor (e.g. 210, 212, 220, 230, and sensors 290) may utilize more than one measurement technique in some embodiments. That is, the cadence sensor 210, for example, may potentially utilize both sound and light based detection. This may make the measurement even more robust. So, for example, cadence may be measured using one to many sensors each utilizing one to many sensing techniques.

Figure 9:
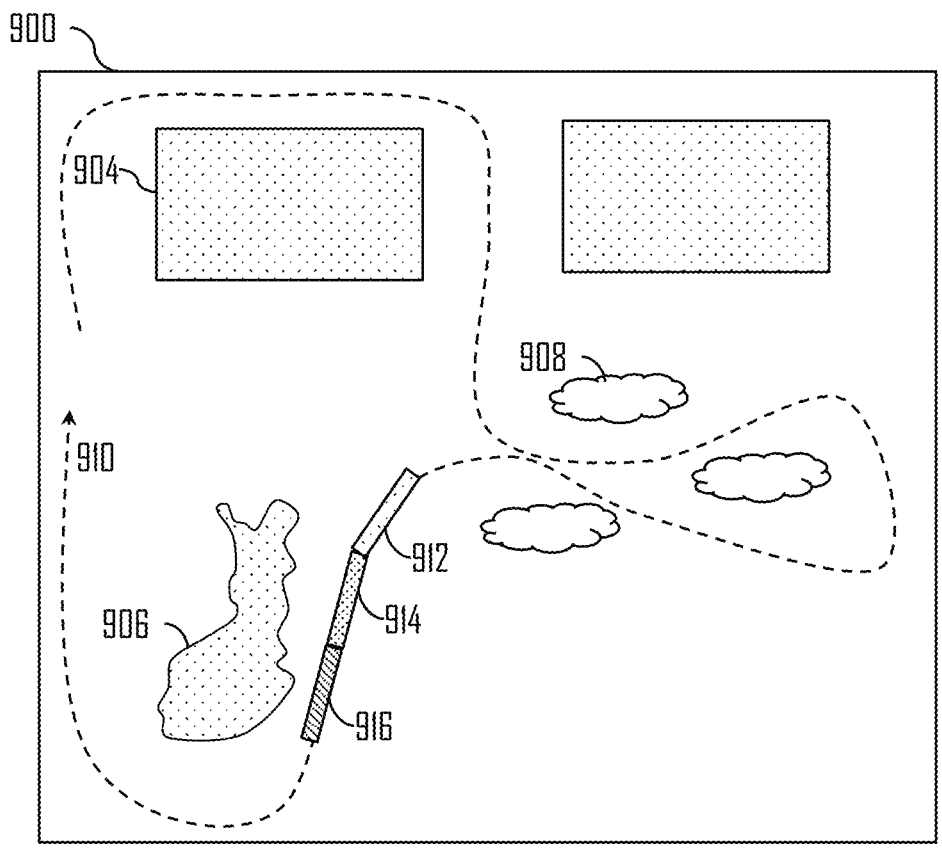

FIG. 9 illustrates yet another embodiment. Referring to FIG. 9, the processing circuitry 212 is further configured to obtain route data (i.e. indicating a route 910) and to associate the one or more cycling metric with the route data, wherein the user interface 114 is configured to output the associated one or more cycling metric and the route data. For example, the output may be performed via display in a map view 900. For example, the output may be performed simultaneously such that the cycling metric(s) are shown on/along the route, for example, in a map view. So, for example, the map view 900 may comprise the route 910 and indication about different metric(s) along/on the route 910. The route data may be obtained using, for example, the motion circuitry 260 and more precisely a satellite position circuitry.

For example, the map view 900 may comprise a map that indicates different map objects, such as buildings 904, plants/trees 908 and/or body of water 906 (e.g. pond, lake, river etc.). In an embodiment, the map is a satellite map. In an embodiment, the map comprises 2D view. In an embodiment, the map comprises 3D view (i.e. three dimensional view).

In FIG. 9, some examples of associating metrics with route are shown. For example, blocks 912, 914, 916 may indicate different riding positions. For example, one of said elements may indicate aero position (i.e. good riding position), one may indicate OK riding position (e.g. half standing/half sitting) and one may indicate bad riding position (e.g. standing). For example, the aero position may be indicated with color red, OK riding position with color yellow and bad riding position with color blue. Different colors than the described may be additionally or alternatively be used. So, in general, different metrics and variations within a metric may be indicated with certain color on the route, for example. Thus, the expression/indication is not necessarily limited to riding position and thus may comprise any of the described metrics (e.g. riding position, drafting, boxed-in, and/or cadence metrics).

According to an embodiment, user interface 114 is configured to control size of user interface elements (e.g. elements on display) and/or outputted sound based on proximity measurement and/or measured speed (e.g. speed may be measured using the motion circuitry 260). For example, the user interface elements and/or the sound output may indicate the one or more cycling metrics. Thus, for example, in standing riding position, the user interface elements may be larger and/or sound output louder than in aero position. So, in general, the sound output volume may be increased as measured distance increases. Another example is that user interface element(s) may be increased in size as the measured distance increases, and vice versa. For example, the distance may be measured using the sensor 220 that measures distance to upper body of the user. Thus, the controlling the interface elements and/or outputted sound may be based on measuring the riding position. Such control may be beneficial as if the user is close to the bicycle computer 110, more information may be outputted to the user utilizing smaller user interface elements. On the other hand, if the user gets farther from the bicycle computer 110, the elements may need to be increased in size in order to enable the user 100 to monitor said cycling metric(s). Similar logic applies to sound, but with audio it may be good to output sound that does not hurt user's 100 ears, for example. Hence, sound volume may be increased in response to the user getting farther from the bicycle computer 110 and decreased in response to the user getting closer. As noted above, for example, the distance may be distance to user's upper body, such as head, which may be the most suitable target for such measurement as it comprises both the eyes and ears. However, measurement to chest may also be possible.

Output by the user interface 114 may refer to plurality of different things. For example, it may comprise output of cycling metrics, such as cadence metric, boxed-in metric, drafting metric, and/or riding position metric. The output may be performed via display 252, via sound output, via haptic output and/or via wireless transfer of data to external entity, to name a few examples. For example, the outputting may comprise transmitting the metric(s) directly to the PED 106 or to the network 180 in which the metric(s) may be associated with a user account of the user 100, and viewed later, for example, using the PED 106. For example, the PED 106 may be used by a trainer of the user 100. For example, the PED 106 may obtain cycling metrics of a plurality of users and monitor the metrics on the PED 106. This may be enhance training of the users. The user interface 114 may be configured, in some embodiments, to output text, numbers and/or graphics. For example, the cycling metrics may be inputted as text, numbers and/or graphics. In an embodiment, the bicycle computer 110 comprises and/or is a wrist unit, such as wrist device 102. In an embodiment, the bicycle computer 110 comprises and/or is a smart phone, mobile phone, a cell phone, or a tablet computer. For example, the wrist unit may comprise proximity sensors for measuring said cycling metrics. The wrist unit may be attached to the wrist of the user or to the bicycle 190.

Reference is made to proximity data which in some embodiments may refer to distance data. Distance to a body part or to another bicycle may refer to proximity to said body part or said another bicycle in some embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware.

In an embodiment, at least some of the processes described in connection with the Figures may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of the Figures or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of the Figures, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with the Figures may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A bicycle computer for monitoring performance of a user of a bicycle, the bicycle computer comprising:
   a processing circuitry;
   a user interface;
   an attaching unit for arranging the bicycle computer in an attached position; and
   an integrated proximity cadence sensor arranged and dimensioned to measure, in the attached position, proximity cadence data being indicative of a distance to at least one leg of the user of the bicycle,
   the processing circuitry configured to obtain the proximity cadence data from the integrated proximity cadence sensor and to process the proximity cadence data into a cadence metric,
   the user interface configured to output the cadence metric.

2. The bicycle computer of claim 1, further comprising a second integrated proximity sensor arranged and dimensioned to measure, in the attached position, first proximity data being indicative of a distance to an upper body part of the user of the bicycle,
   the processing circuitry configured to process the first proximity data into a riding position metric.

3. The bicycle computer of claim 2, wherein the upper body part of the user comprises at least one of a stomach, chest, head.

4. A bicycle computer for monitoring performance of a user of a bicycle, the bicycle computer comprising:
   a processing circuitry;
   a user interface;
   an attaching unit for arranging the bicycle computer in an attached position; and
   an integrated proximity sensor arranged and dimensioned to measure, in the attached position, proximity data being indicative of a distance to a body part,
   the processing circuitry configured to obtain the proximity data from the integrated proximity sensor and to process the proximity data into one or more cycling metric,
   the user interface configured to output the one or more cycling metric,
   the proximity sensor comprising first and second cadence sensors arranged and dimensioned to measure, in the attached position, first and second cadence data respectively, the first cadence data being indicative of a distance to a first leg of the user and the second cadence data being indicative of a distance to a second leg of the user,
   the processing circuitry configured to obtain the first and second cadence data, and to perform a sensor fusion algorithm to obtain a cadence metric.

5. The bicycle computer of claim 1, further comprising:
   a motion circuitry configured to measure motion data,
   the processing circuitry configured to obtain the motion data and the cadence data, and to perform a sensor fusion algorithm to obtain the cadence metric.

6. A bicycle computer for monitoring performance of a user of a bicycle, the bicycle computer comprising:

a processing circuitry;
a user interface;
an attaching unit for arranging the bicycle computer in an attached position; and
an integrated proximity sensor arranged and dimensioned to measure, in the attached position, proximity data being indicative of a distance to a body part,
the processing circuitry configured to obtain the proximity data from the integrated proximity sensor and to process the proximity data into one or more cycling metric,
the user interface configured to output the one or more cycling metric,
the integrated proximity sensor comprising a proximity sensor arranged and dimensioned to measure, in the attached position, second proximity data being indicative of a distance to another bicycle and/or another user riding another bicycle,
the processing circuitry configured to process the second proximity data into a drafting metric.

7. The bicycle computer of claim 1, wherein at least one of the integrated proximity cadence sensor and/or an integrated proximity sensor utilizes light-based sensing.

8. The bicycle computer of claim 1, wherein at least one of the integrated proximity cadence sensor and/or an integrated proximity sensor utilizes sound-based sensing.

9. The bicycle computer of claim 1, wherein at least one of the integrated proximity cadence sensor and/or an integrated proximity sensor utilizes impedance-based sensing.

10. The bicycle computer of claim 1, wherein, in the attached position, the bicycle computer is attached to a handlebar of the bicycle.

11. The bicycle computer of claim 1, further comprising an activation unit configured to activate at least one of the integrated proximity cadence sensor and/or an integrated proximity sensor in response to detecting motion exceeding an activation threshold.

12. The bicycle computer of claim 11, wherein the activation unit is further configured to deactivate at least one of the integrated proximity cadence sensor and/or an integrated proximity sensor in response to detecting motion exceeding a deactivation threshold.

13. The bicycle computer of claim 1, further comprising one or more further integrated proximity sensors arranged and dimensioned, in the attached position, to be directed to front and sides of the bicycle, the processing circuitry configured to process the measurements from the one or more further integrated proximity sensors into a boxed-in metric.

14. The bicycle computer of claim 1, wherein the processing circuitry is configured to obtain route data and to associate one or more cycling metric with the route data, the user interface configured to output the associated one or more cycling metric and the route data.

15. The bicycle computer of claim 1, wherein the integrated proximity cadence sensor is arranged and dimensioned to measure, in the attached position, first proximity cadence data, the first proximity cadence data being indicative of a distance to a first leg of the user, the bicycle computer comprising a second integrated proximity cadence sensor arranged and dimensioned to measure, in the attached position, second proximity cadence data, the second proximity cadence data being indicative of a distance to a second leg of the user, the processing circuitry configured to obtain the first proximity cadence data and the second proximity cadence data, and to perform a sensor fusion algorithm to obtain a cadence metric.

16. The bicycle computer of claim 1, further comprising a third integrated proximity sensor arranged and dimensioned to measure, in the attached position, second proximity data being indicative of a distance to another bicycle and/or another user riding another bicycle, the processing circuitry configured to process the second proximity data into a drafting metric.

17. The bicycle computer of claim 1, wherein the integrated proximity cadence sensor measures the proximity cadence data without using an external sensor device attached to the at least one leg of the user.

18. The bicycle computer of claim 1, wherein the integrated proximity cadence sensor measures the proximity cadence data by performing image processing, thereby measuring the proximity cadence date without using an external sensor device attached to the at least one leg of the user.

19. The bicycle computer of claim 1, wherein the integrated proximity cadence sensor measures the proximity cadence data using a beam of at least one of at least one of light, sound, and/or energy, thereby measuring the proximity cadence date without using an external sensor device attached to the at least one leg of the user.

* * * * *